(12) United States Patent
Peiffer

(10) Patent No.: US 7,844,683 B2
(45) Date of Patent: Nov. 30, 2010

(54) STRING MATCHING METHOD AND DEVICE

(75) Inventor: Christopher Peiffer, Menlo Park, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1866 days.

(21) Appl. No.: 09/975,286

(22) Filed: Oct. 10, 2001

(65) Prior Publication Data

US 2003/0069941 A1    Apr. 10, 2003

(51) Int. Cl.
G06F 15/16      (2006.01)
G06F 17/00      (2006.01)
G06F 17/20      (2006.01)
G06F 15/173     (2006.01)
G06F 17/21      (2006.01)

(52) U.S. Cl. .................... 709/217; 715/254; 718/100; 718/102

(58) Field of Classification Search ......... 709/200–216, 709/217–253; 719/310–319, 300, 328–332; 718/100, 102; 715/234
See application file for complete search history.

(56) References Cited

U.S. PATENT DOCUMENTS

| | | | | |
|---|---|---|---|---|
| 5,329,598 A * | 7/1994 | Geist | ............................ | 382/228 |
| 5,381,127 A * | 1/1995 | Khieu | ...................... | 340/146.2 |
| 5,740,361 A * | 4/1998 | Brown | ............................ | 726/5 |
| 5,953,503 A * | 9/1999 | Mitzenmacher et al. | ..... | 709/203 |
| 5,966,663 A * | 10/1999 | Gleason | ........................ | 455/466 |
| 6,085,235 A * | 7/2000 | Clarke et al. | ................. | 709/219 |
| 6,092,196 A * | 7/2000 | Reiche | ........................... | 726/6 |
| 6,098,125 A * | 8/2000 | Fiacco et al. | ................... | 710/52 |
| 6,178,204 B1 * | 1/2001 | Hazra | ..................... | 375/240.25 |
| 6,314,095 B1 * | 11/2001 | Loa | ............................ | 370/352 |
| 6,321,265 B1 * | 11/2001 | Najork et al. | ................ | 709/224 |
| 6,359,911 B1 * | 3/2002 | Movshovich et al. | ........ | 370/536 |
| 6,377,991 B1 * | 4/2002 | Smith et al. | .................. | 709/226 |
| 6,381,616 B1 * | 4/2002 | Larson et al. | ................ | 707/201 |
| 6,449,269 B1 * | 9/2002 | Edholm | ........................ | 370/352 |
| 6,523,108 B1 * | 2/2003 | James et al. | .................. | 712/224 |
| 6,532,493 B1 * | 3/2003 | Aviani et al. | ................. | 709/224 |
| 6,546,021 B1 * | 4/2003 | Slane | .......................... | 370/465 |
| 6,564,255 B1 * | 5/2003 | Mobini et al. | ................ | 709/219 |
| 6,631,466 B1 * | 10/2003 | Chopra et al. | ................ | 712/300 |
| 6,654,796 B1 * | 11/2003 | Slater et al. | .................. | 709/220 |
| 6,711,164 B1 * | 3/2004 | Le et al. | ....................... | 370/392 |

(Continued)

OTHER PUBLICATIONS

HTTP 1.1, Fielding et al., Jun. 28, 2001, pp. 1-6, Chapter 3 Protocol Parameters, pp 1-10, Chapter 4 HTTP Message, pp. 1-4, Chapter 14 Header Field Definitions, pp. 1-37.*

(Continued)

Primary Examiner—Haresh N Patel
(74) Attorney, Agent, or Firm—Shumaker & Sieffert, P.A.

(57) ABSTRACT

A method and device for string matching HTTP headers. The method typically includes identifying a predefined string, identifying an unknown string to compare with the predefined string, performing a bitwise exclusive OR operation on an ASCII binary representation of at least one segment of the unknown string and an ASCII binary representation of at least one segment of the predefined string, and identifying a case-insensitive string match based on the exclusive OR operation. The method may further include performing a bitwise operation with a predefined flag to determine the case-insensitive segment match.

21 Claims, 12 Drawing Sheets

U.S. PATENT DOCUMENTS

| | | | | |
|---|---|---|---|---|
| 6,751,209 | B1* | 6/2004 | Hamiti et al. | 370/349 |
| 6,758,403 | B1* | 7/2004 | Keys et al. | 235/462.45 |
| 6,842,860 | B1* | 1/2005 | Branstad et al. | 713/170 |
| 6,986,047 | B2* | 1/2006 | Giles et al. | 713/175 |
| 7,017,162 | B2* | 3/2006 | Smith et al. | 719/328 |
| 7,240,100 | B1* | 7/2007 | Wein et al. | 709/214 |
| 7,249,369 | B2* | 7/2007 | Knouse et al. | 726/1 |
| 2002/0091755 | A1* | 7/2002 | Narin | 709/203 |
| 2002/0101989 | A1* | 8/2002 | Markandey et al. | 380/210 |
| 2002/0118671 | A1* | 8/2002 | Staples et al. | 370/352 |
| 2003/0016673 | A1* | 1/2003 | Pendakur et al. | 370/394 |
| 2003/0037237 | A1* | 2/2003 | Abgrall et al. | 713/166 |
| 2004/0222878 | A1* | 11/2004 | Juels | 340/10.1 |
| 2005/0004875 | A1* | 1/2005 | Kontio et al. | 705/52 |
| 2005/0060752 | A1* | 3/2005 | Pendakur et al. | 725/93 |
| 2005/0240943 | A1* | 10/2005 | Smith et al. | 719/328 |
| 2005/0246716 | A1* | 11/2005 | Smith et al. | 719/315 |

OTHER PUBLICATIONS

Thinkage GCOS8 SS C Reference Manual, pp. 1-71, 1996.*

Rob Saccoccio, "Case insensitive compare when getting environment headers", Wed, Jun. 6, 2001, Chelsea.net, pp. 1 and 2.*

Eric Sit, "Case insensitive compare when getting environment headers", Mon, Jun. 4, 2001, pp. 1 and 2.*

Knowledge Base Document String Compare Function, Description, Aug. 21, 2001, pp. 1-2.* www.cyber.com, pp. 3-12, Aug. 11, 2001.*

U.S. Appl. No. 09/680,675, entitled "Network Data Transfer Acceleration System and Method," filed Oct. 6, 2000.

U.S. Appl. No. 09/680,997, entitled "Image Transfer System and Method," filed Oct. 6, 2000.

U.S. Appl. No. 09/680,998, entitled "Web Page Source File Transfer System and Method," filed Oct. 6, 2000.

U.S. Appl. No. 60/239,552, entitled "HTTP Multiplexer/Demultiplexer," filed Oct. 10, 2000.

U.S. Appl. No. 60/239,071, entitled "Connection Management System and Method," filed Oct. 5, 2000.

U.S. Appl. No. 60/287,188, entitled "Data Transfer System and Method," filed Apr. 27, 2001.

U.S. Appl. No. 60/308,234, entitled Computer Networking Device, filed Jul. 26, 2001.

U.S. Appl. No. 60/313,006, entitled "System and Method for Identifying a Unique User Interacting with a Web Server," filed Aug. 16, 2001.

* cited by examiner

```
              28  30   32                                    26
              /   /    /                                    /
            GET / HTTP/1.1
    34      Accept: image/gif, image/x-xbitmap, image/jpeg
     →      Accept-Language: en-us
            Accept-Encoding: gzip, deflate              ← 36
    34a     User-Agent: Mozilla/4.0 (compatible; MSIE 5.01; Windows NT)
       ↘   Host: examplehost.com
            Connection: Keep-Alive
```

FIG. 4

```
                                                        38
            40 42  44                                  /
            /  /   /
            HTTP/1.1 200 OK
            Date: Mon, 18 Jun 2001 20:56:29 GMT
            Server: Apache/1.3.6 (Unix)
    46      Last-Modified: Fri, 09 Jun 2001 13:12:10 GMT
     →      ETag: "71d0eae-184b-3b3ca8e4"          48
            Accept-Ranges: bytes                   ←
            Content-Length: 227
            Connection: close
            Content-type: text/html
                                            52   50
                                            ←    /
            <title> Example</title>
            <img src="/images/picture1.gif">
            <h1>Hi there</h1>
            This is an example of a web page.
```

FIG. 5

| Dec | Binary | Symbol | Dec | Binary | Symbol |
|-----|--------|--------|-----|--------|--------|
| 032 | 00100000 | Space | 080 | 01010000 | P |
| 033 | 00100001 | ! | 081 | 01010001 | Q |
| 034 | 00100010 | " | 082 | 01010010 | R |
| 035 | 00100011 | # | 083 | 01010011 | S |
| 036 | 00100100 | $ | 084 | 01010100 | T |
| 037 | 00100101 | % | 085 | 01010101 | U |
| 038 | 00100110 | & | 086 | 01010110 | V |
| 039 | 00100111 | ' | 087 | 01010111 | W |
| 040 | 00101000 | ( | 088 | 01011000 | X |
| 041 | 00101001 | ) | 089 | 01011001 | Y |
| 042 | 00101010 | * | 090 | 01011010 | Z |
| 043 | 00101011 | + | 091 | 01011011 | [ |
| 044 | 00101100 | , | 092 | 01011100 | \ |
| 045 | 00101101 | - | 093 | 01011101 | ] |
| 046 | 00101110 | . | 094 | 01011110 | ^ |
| 047 | 00101111 | / | 095 | 01011111 | _ |
| 048 | 00110000 | 0 | 096 | 01100000 | ` |
| 049 | 00110001 | 1 | 097 | 01100001 | a |
| 050 | 00110010 | 2 | 098 | 01100010 | b |
| 051 | 00110011 | 3 | 099 | 01100011 | c |
| 052 | 00110100 | 4 | 100 | 01100100 | d |
| 053 | 00110101 | 5 | 101 | 01100101 | e |
| 054 | 00110110 | 6 | 102 | 01100110 | f |
| 055 | 00110111 | 7 | 103 | 01100111 | g |
| 056 | 00111000 | 8 | 104 | 01101000 | h |
| 057 | 00111001 | 9 | 105 | 01101001 | i |
| 058 | 00111010 | : | 106 | 01101010 | j |
| 059 | 00111011 | ; | 107 | 01101011 | k |
| 060 | 00111100 | < | 108 | 01101100 | l |
| 061 | 00111101 | = | 109 | 01101101 | m |
| 062 | 00111110 | > | 110 | 01101110 | n |
| 063 | 00111111 | ? | 111 | 01101111 | o |
| 064 | 01000000 | @ | 112 | 01110000 | p |
| 065 | 01000001 | A | 113 | 01110001 | q |
| 066 | 01000010 | B | 114 | 01110010 | r |
| 067 | 01000011 | C | 115 | 01110011 | s |
| 068 | 01000100 | D | 116 | 01110100 | t |
| 069 | 01000101 | E | 117 | 01110101 | u |
| 070 | 01000110 | F | 118 | 01110110 | v |
| 071 | 01000111 | G | 119 | 01110111 | w |
| 072 | 01001000 | H | 120 | 01111000 | x |
| 073 | 01001001 | I | 121 | 01111001 | y |
| 074 | 01001010 | J | 122 | 01111010 | z |
| 075 | 01001011 | K | 123 | 01111011 | { |
| 076 | 01001100 | L | 124 | 01111100 | | |
| 077 | 01001101 | M | 125 | 01111101 | } |
| 078 | 01001110 | N | 126 | 01111110 | ~ |
| 079 | 01001111 | O | 127 | 01111111 | DEL |

```
int
rln_strncasematch_cheat(const char *str1, const char *str2,
                        register int len)
{
    u_int32_t *hold1, *hold2;
    register u_int32_t match;
    u_int32_t shold1, shold2;
    register int i;

for (i=0; i <= len - 4; i += 4) { hold1 = (u_int32_t *)(str1 + i);
        hold2 = (u_int32_t *)(str2 + i);

match = *hold1 ^ *hold2;

if (match != 0 && ((match | LCASE_HIT) > LCASE_HIT)) {
            return 0;
        }
    } if (i < len) {
        hold1 = (u_int32_t *)(str1 + i);
        hold2 = (u_int32_t *)(str2 + i);

shold1 = *hold1 << (4 - (len - i)) * 8;
        shold2 = *hold2 << (4 - (len - i)) * 8;

match = shold1 ^ shold2;

if (match != 0 && ((match | LCASE_HIT) > LCASE_HIT)) {
            return 0;
        }
    } return 1;
}
```

FIG. 13

```
int
rln_strncasematch(const register unsigned char *str1,
                  const register unsigned char *str2,
                  const register int len)
{
    register int i;
    register unsigned char match;

for (i=0; i<len; i++) { match = str1[i] ^ str2[i];

if (!match)
            continue;

if (match != LCASE || (str1[i] & EIGHTBIT) ||
                (str2[i] & EIGHTBIT) || (str1[i] < 'A')
                || (str2[i] < 'A')) {
            return 0;
        }
    }
    return 1;
}
```

STRING MATCHING METHOD AND DEVICE

TECHNICAL FIELD

The present invention relates generally to improved data transmission over computer networks, and more particularly to a string matching method and device.

BACKGROUND OF THE INVENTION

The Internet has experienced explosive growth in recent years. The emergence of the World Wide Web has enabled millions of users around the world to download easily web resources such as text, graphics, video, and sound data while at home, work, or from remote locations via wireless devices. This is achieved primarily through the use of Hypertext Transfer Protocol (HTTP), a standardized way for computers to communicate with each other.

To request a web resource, a client web browser sends an HTTP request for the web resource to a server. The HTTP request often includes lengthy HTTP header information that must be processed by the server. In order to process the header information, the server must perform string matching, to identify whether known strings exist in the HTTP header. Further, according to the HTTP specification (HTTP/1.1, Internet RFC 2616, Fielding et al.), the disclosure of which is herein incorporated by reference, HTTP headers are case insensitive. Thus, not only must string matching be performed for HTTP headers, but the string matching must be performed in a case-insensitive manner. This case-insensitive string matching requires additional processor calculations, and thereby contributes significantly to server delay, or latency, in responding to requests from the client.

It would be desirable to provide a system, method, and device capable of quickly and efficiently performing case-insensitive string matching on header information to increase processor efficiency and thereby reduce latency.

SUMMARY OF THE INVENTION

A method and device for string matching HTTP headers are provided. The method typically includes identifying a predefined string, identifying an unknown string to compare with the predefined string, performing a bitwise exclusive OR operation on an ASCII binary representation of at least one segment of the unknown string and an ASCII binary representation of at least one segment of the predefined string, and identifying a case-insensitive string match based on the exclusive OR operation. The method may further include performing a bitwise operation with a predefined flag to determine the case-insensitive segment match.

The device for improving data transfer via a computer network, the device including a processor to compare an unknown header with a predefined header by performing a bitwise exclusive OR operation on the binary representations of the headers, wherein a header match is identified based on the exclusive OR operation.

BRIEF DESCRIPTION OF THE DRAWINGS

FIG. 4 is an exemplary HTTP request from a remote client to a server.

FIG. 5 is an exemplary HTTP response from the server to the remote client.

FIG. 12 is a table of standard ASCII characters (only printing characters shown).

FIG. 13 is exemplary computer code implementing the string matching method according to one embodiment of the present invention.

DETAILED DESCRIPTION OF THE INVENTION

Figure 1:
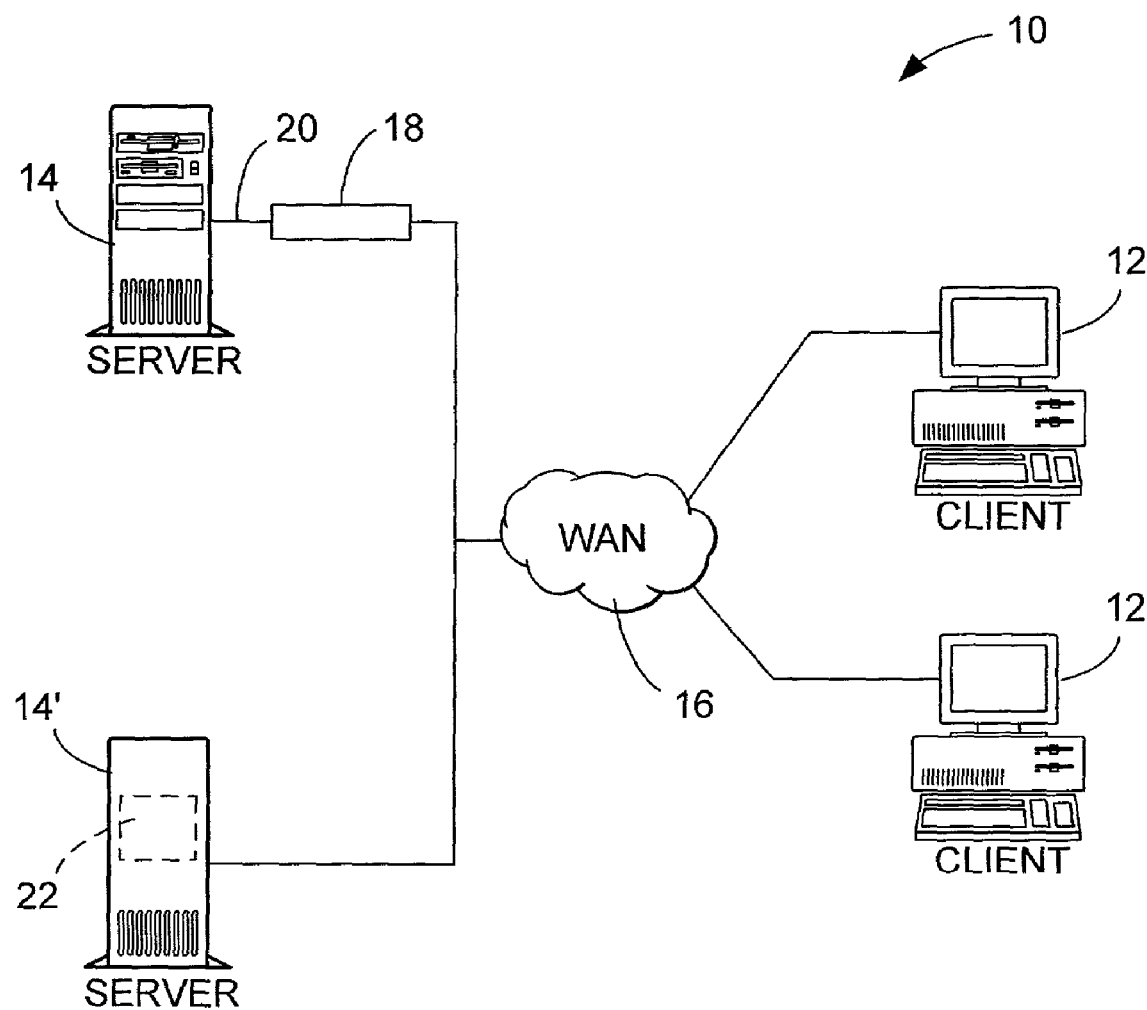
FIG. 1 is a schematic view of a networking system according to one embodiment of the present invention.

Referring initially to FIG. 1, a computer networking system according to one embodiment of the present invention is shown generally at 10. System 10 typically includes a plurality of remote clients 12 configured to communicate with servers 14 via computer network 16. System 10 further includes a networking device 18 connected to server 14 via a Local Area Network (LAN) 20. Alternatively, networking device 18 exists as an internal networking device 22 in a server 14'. For example, the device may be implemented as a network card within server 14', or as part of the operating system software or server software on server 14'.

Remote client 12 typically is a personal computer including a processor coupled to a communications bus. A mass storage device, such as a hard drive, CD-ROM (compact disk, read-only memory) drive, tape drive, etc., and a memory are also typically linked to the communications bus. The memory typically includes random access memory (RAM), read-only memory (ROM), and L1 and L2 cache. Remote client 12 typically is configured to access computer network 16 via a network interface and browser software. Alternatively, remote client 12 may be a portable data assistant, web-enabled wireless device, mainframe computer, or other suitable computing device.

Server 14 typically is a computer similar to the personal computer described above. Server 14 includes a server program that serves web resources to and otherwise communicates with remote clients 12. The server program typically is configured to receive Hypertext Transfer Protocol (HTTP) requests for network resources from remote clients 12, and in response, send HTTP responses with the requested network resources to remote clients 12 via computer network 16, as further described below.

Computer network 16 may be a wide area network (WAN) such as the Internet, although computer network 16 may be a LAN or a metropolitan area network (MAN). Computer network 16 operates using TCP(Transfer Control Protocol)/IP (Internet Protocol), although other protocols suitable for carrying HTTP requests and responses may be used.

Figure 2:
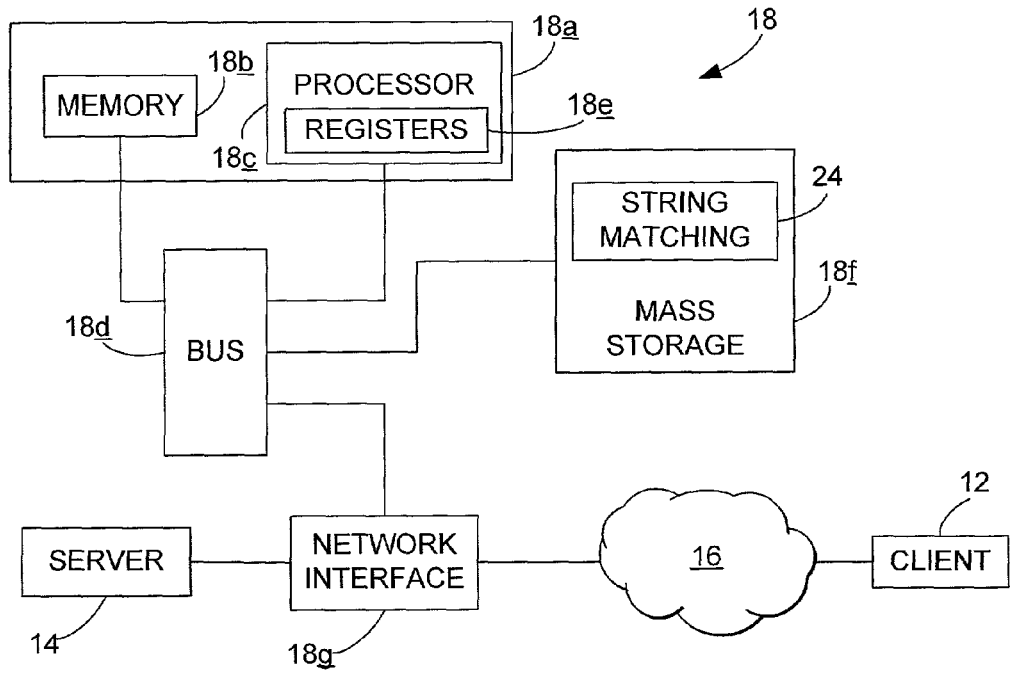
FIG. 2 is a schematic view of a networking device according to one embodiment of the present invention.

Referring to FIG. 2, networking device 18 typically includes a controller 18a having a memory 18b and processor 18c linked by a bus 18d. Processor 18c includes easily accessible temporary storage areas known as registers 18e in which bitwise arithmetic may be performed. Register 18e may be, for example, a 16-bit, 32-bit or 64-bit register, which refers to the number of bits that a processor can act on, move, manipulate, etc. using the register. Each bit of memory in the register stores a binary digit of a 1 or 0. Also coupled to bus 18d is a mass storage device 18f including a string matching module 24 configured to implement the methods described below. Networking device 18 also typically includes a network interface 18g coupled to bus 18d and to an external network connection to computer network 16. Network interface 18g is configured to enable networking device 18 to communicate with remote client 12 via WAN computer network 16 and with server 14 via LAN computer network 20. An example of a suitable network interface is the Intel Pro/100 card, commercially available from Intel Corporation of Santa Clara, Calif.

Figure 3:
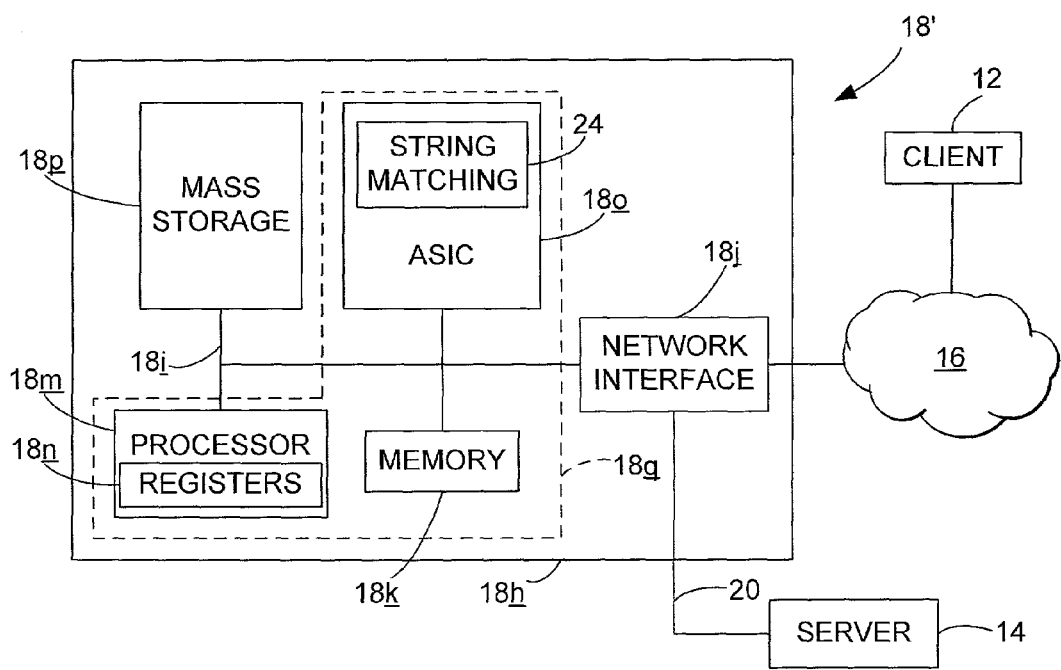
FIG. 3 is a schematic view of a networking device according to another embodiment of the present invention.

FIG. 3 shows another embodiment of a networking device 18' according to the present invention. Networking device 18' typically includes an integrated circuit board 18h. The integrated circuit board contains a bus 18i connecting a network interface 18j, memory 18k, processor 18m with registers 18n, application specific integrated circuit (ASIC) 18o, and mass storage device 18p. Network interface 18j is configured to enable networking device 18' to communicate with remote client 12 via computer network 16 and with server 14 via LAN 20. ASIC 18o typically contains a string matching module 24 configured to implement the methods described below. ASIC 18o, processor 18m, and memory 18k form a controller 18q configured to process HTTP requests. It will be appreciated that networking devices 18, 18' may be stand-alone network appliances or may be integrated into server 14' such as internal networking device 22, described above.

Networking devices 18, 18' are more fully described in co-pending U.S. patent application Ser. Nos. 09/680,675, 09/680,997, and 09/680,998, filed Oct. 6, 2000, Nos. 60/239,552 and 60/239,071, filed Oct. 10, 2000, No. 60/287,188, filed Apr. 27, 2002, and No. 60/308,234 filed Jul. 26, 2001, and No. 60/313,006 filed Aug. 16, 2001, the disclosures of each of which are herein incorporated by reference.

String matching module 24 typically is configured to reduce the time it takes to transfer data between remote clients 12 and servers 14. Remote clients 12 and servers 14 communicate through the use of Hypertext Transfer Protocol (HTTP), an Internet standard based on the exchange of HTTP messages in the forms of requests and responses. HTTP requests and responses include header fields, referred to simply "headers," at the beginning of each HTTP message. These headers require processing or "parsing" by the server, so that the server can appropriately respond to the request.

Headers typically are composed of alphabetic characters. According to the HTTP specification (HTTP/1.1, Internet RFC 2616, Fielding et al.), all headers are case-insensitive, meaning that the HTTP protocol does not differentiate between uppercase and lowercase alphabetic characters. The embodiments of the present invention are typically configured to recognize headers from HTTP versions 0.9, 1.0, and 1.1 Examples of these headers include "Cache-control", "Connection", "Date", "MIME-version", "Pragma", "Trailer", "Transfer-coding", "Upgrade", "Via", "Warning", "Accept", "Accept-charset", "Accept-Encoding", "Accept-language", "Authorization", "Expect", "From", "Host", "If-modified-since", "If-match", "If-none-match", "If-range", "If-Unmodified-Since", "Max-forwards", "Proxy-authorization", "Range", "Referer", "Referer TE", "User-Agent", "Allow", "Content-encoding", "Content-language", "Content-length", "Content-location", "Content-md5", "Content-range", "Content-type", "Expires", "Last-modified", "Accept-Ranges", "Age", "Etag", "Location", "Proxy-authenticate", "Retry-after", "Server", "Vary", and "WWW-Authenticate". It should be understood that this list is not exhaustive and that other presently used HTTP headers, as well as new headers included in future versions of HTTP, are within the scope of the present invention.

An exemplary request message (or simply "request") 26 from a client to a server is shown in FIG. 4. The first line of request 26 includes a request method 28 to be applied to a resource, path 30 to the resource, and the HTTP version in use 32. Request headers 34 and corresponding request header values 36 pass server 14 additional information about request 26 and remote client 12 itself. In the depicted request, request method 28 is "GET", which instructs the server to send the web resource located at the URI formed by path 30 and host 34a. In FIG. 4, the depicted path 30 is "/", and the host is "examplehost.com", which results in a URI of "http://examplehost.com/". Of course, longer paths such as "/myfolder/myfile.html" may also be used.

An exemplary response message (or simply "response") 38 from server to client in response to a received request 26 is shown in FIG. 5. In the first line, response 38 conveys to remote client 12 the version 40 of the HTTP protocol that server 14 uses, a three-digit status code 42, and a description of the result 44. Headers 46 and header values 48 pass additional information related to the response. An entity body 50 follows the last header line. Entity body 50 may include virtually any web resource or requested data. For example, entity body 50 may be content in the Hypertext Markup Language (HTML), or an image, movie, audio file, or script, etc. Response 38 includes a blank line 52 to separate headers 46 and entity body 50. If an error or problem occurs, server 14 generally will send response 38 with a status code indicative of the problem and/or headers 46 to communicate server information.

To process HTTP requests efficiently, string matching module 24 is configured to parse headers by using a string matching method, described in more detail below. String matching module 24 identifies case-insensitive header or string matches based on results of performing one or more bitwise operations between a predefined (known) string and a corresponding unknown string, typically incoming data from remote client 12. The predefined string may be from a record or a hash table created from previous known headers, and may be stored in memory and/or accessed from a linked database. A case-insensitive string match occurs when all of the characters of an unknown string are found to match all of the corresponding characters of a predefined string. Hereinafter, "strings" will be used to refer both to the predefined string and the unknown string.

Characters in strings are typically represented using ASCII (American Standard Code for Information Interchange). String matching module 24 uses the ASCII values, specifically the ASCII binary representations or forms of these characters, in bitwise operations to determine whether a string match exists. In ASCII, uppercase and lowercase alphabetic characters differ by 32 (differing in exactly the fifth bit position when the characters are in binary form). The string matching module is configured to detect this difference to identify case-insensitive string matches, as described in more detail below. Because two characters are not required to be in the same case to match, string matching module 24 may save computational steps by avoiding a step of checking for the counterpart lowercase or uppercase character separately.

String matching module 24 typically divides the strings into segments of one or more characters. The length of each character is one byte, which takes up 8 bits in a register. According to one embodiment of the invention, the strings are divided into segment that are 4 bytes (32 bits) long, however, it will be understood that the segments may be longer or shorter depending on the size of the registers and/or the configuration of networking device 18. String matching module 24 loads the bitwise value of the segments into separate registers and performs bitwise operations on the segments.

One of the bitwise operations used is the exclusive OR (XOR, ^) operator. The XOR operator operates on corresponding bits from each loaded register. If the bits are identical (such as a 0-0 or 1-1), the result of the comparison is 0, and if the bits are different (such as a 1-0 or 0-1), the result of the comparison is 1. Registers may be loaded with ASCII binary representations of segments of strings, predefined flags, etc. and the XOR operator will perform the function in the same manner.

Another bitwise operation that may be used is the AND (&) operator, which also operates on corresponding bits from each loaded register. Both bits have to be 1 in order to yield a result of 1, otherwise, the result will be 0. The OR (|) operator yields a 1 if either bit is 1 and a 0 if both bits are 0. Other bitwise operations may also be used.

As described in more detail below, string matching module 24 performs bitwise operations on string segments, on results from prior bitwise operations, and on predefined values or flags, in order to obtain an indication of a case-insensitive match. Oftentimes, a predefined flag is used to determine the differences in values compared and to determine boundaries of acceptable ASCII values. For the sake of brevity, hexadecimal notation is used herein to represent the binary representations of predefined flags.

String matching module 24 typically checks that characters of strings are alphabetic in order to determine case-insensitive matches. Because string matching module 24 has a record of predefined strings that contain valid characters, false string matches resulting from ASCII characters located within the predetermined boundaries of ASCII values are prevented. An example of a false match may be finding '{' and '[' to be a positive string match.

String matching module 24 may be used to match strings from two header values having alphabetic characters. That is, string matching module 24 may compare unknown header values to predefined header values. For example, an unknown header value such as one located after header "Content-Type" may be compared to predefined header values "JavaScript" or "image".

Figure 6:
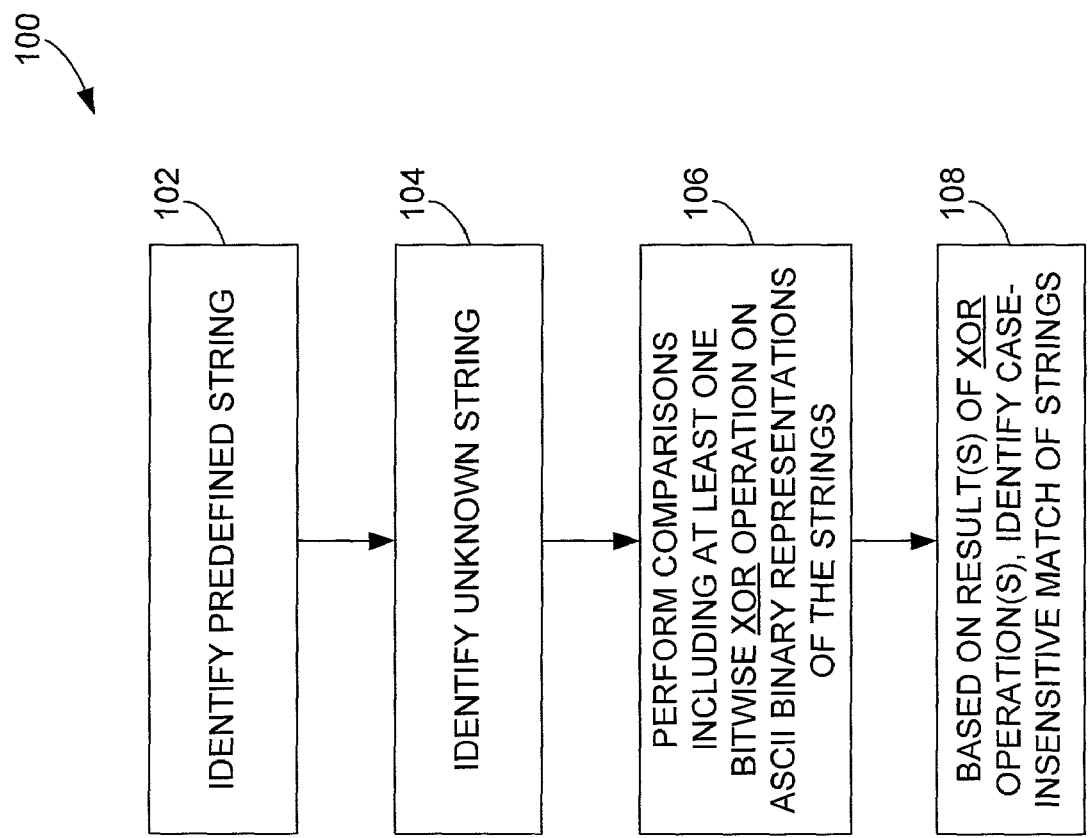
FIG. 6 is a flowchart of a string matching method according to one embodiment of the present invention.

Turning to FIG. 6, a string matching method according to one embodiment of the present invention is shown at 100. Typically the lengths of the two strings to compare are known and equivalent. Method 100 includes identifying a predefined string at 102 and identifying an unknown string to compare with the predefined string at 104. The predefined string is typically selected from a record of strings, each having only alphabetic characters. Typically, the predefined string is an HTTP header. The unknown string is typically a header to be compared with the predefined string. Both segments typically contain the same number of characters. As described above, segment size is dependent on the configuration and capabilities of networking device 18. At 106, the method includes performing comparisons including at least one bitwise XOR operation on the ASCII binary representations of the strings. The method includes identifying a case-insensitive match of the strings based on the result(s) of the XOR operation(s) at 108.

Figure 7:
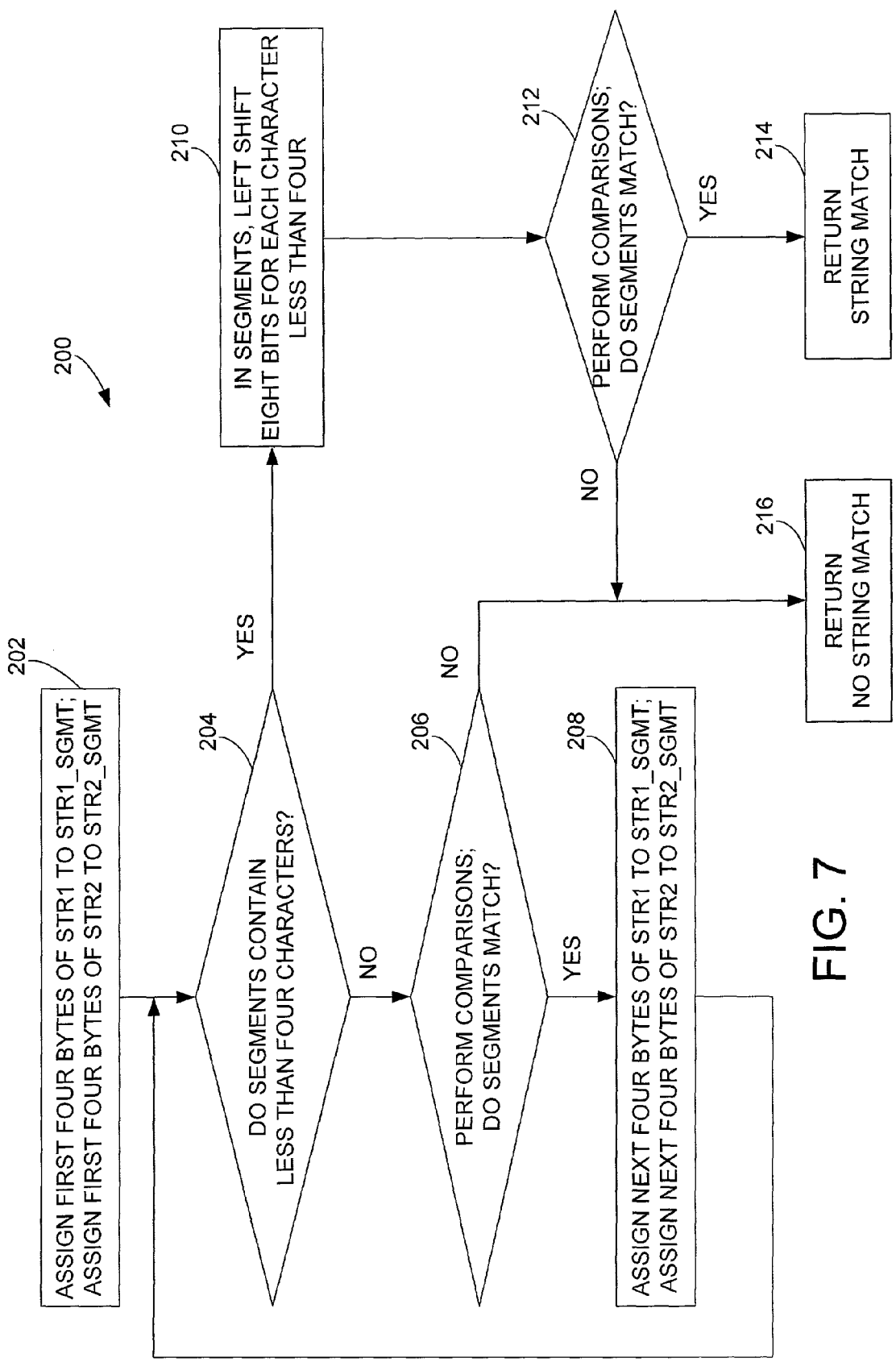
FIG. 7 is a flowchart of a string matching method according to another embodiment of the present invention.

Referring now to FIG. 7, a string matching method according to another embodiment of the present invention is shown at 200. After identifying strings to compare, method 200 includes a step 202 of identifying segments of strings to compare. Step 202 includes assigning the first four bytes of string 1 (str1) to a segment of str1 (str1_sgmt) and assigning the first four bytes of string 2 (str2) to a segment of str2 (str2_sgmt). As described above, each segment is loaded into a separate register 18e. Method 200 proceeds to check if the segments contain less than four characters at step 204. If the segments do not contain less than four characters, method 200 continues to step 206 to perform comparisons and to check if the segments match, which is described in detail in FIG. 8. If the segments match, the method continues to step 208 to assigning the next four bytes of str1 to str1_sgmt and assigning the next four bytes of str2 to str2_sgmt thus identifying subsequent segments of the strings. Step 208 includes reloading each of the registers with segments to compare.

If at step 204, str1_sgmt and str2_sgmt contain less than four characters, method 200 includes left-shifting the binary value of each segment by eight bits for each character less than four at step 210. Registers holding str1_sgmt and str2_sgmt each shift to the left by eight bits and replace empty bits on the right caused by shifting with zeros. Method 200 continues to step 212, where the method includes performing comparisons to determine if the segments match, in a similar manner to step 206. If the segments match, method 200 returns an indication of a string match at step 214. If segments do not match at step 206, the method goes to step 216 to return a negative string match.

Figure 8:
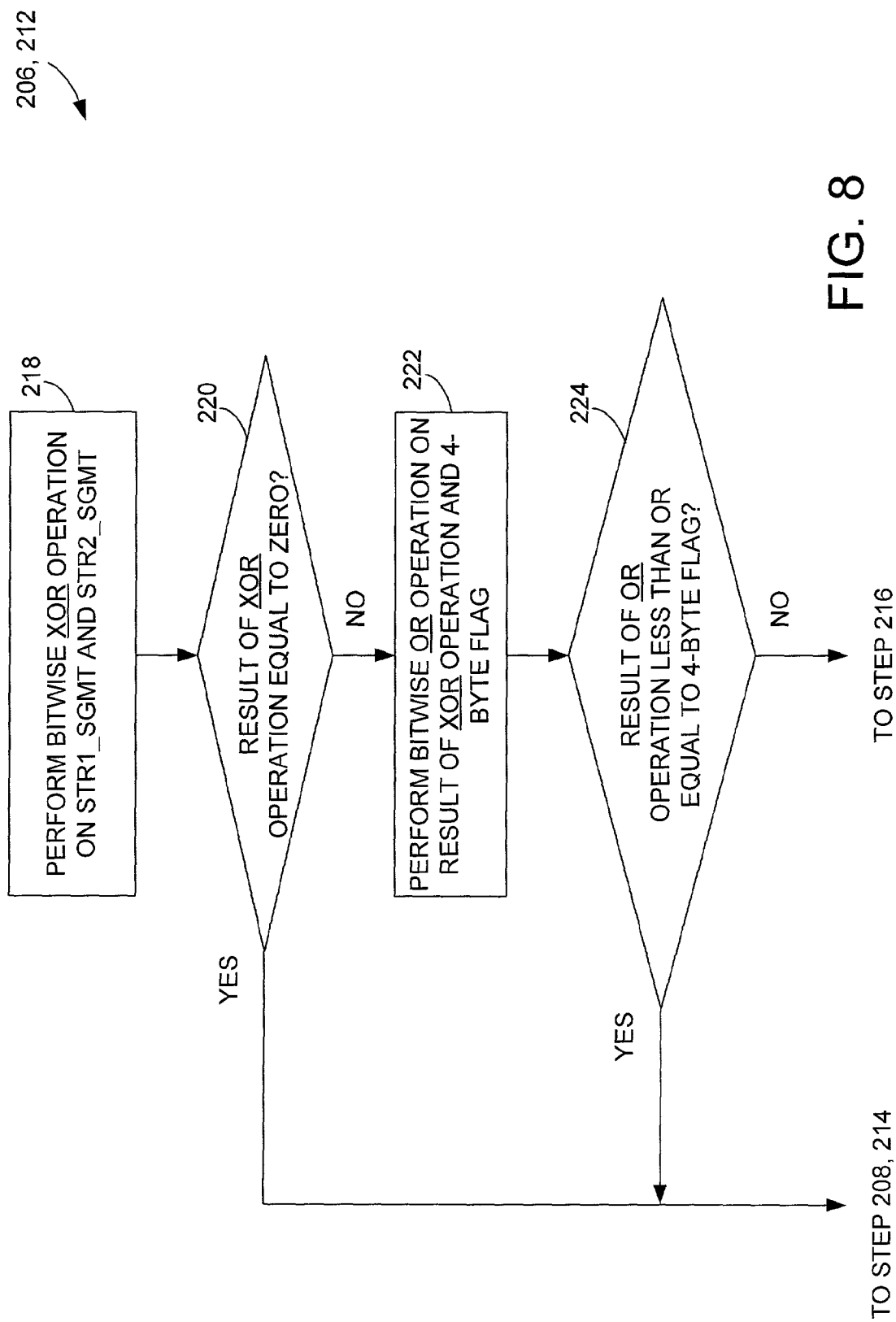
FIG. 8 is a continuation of the flowchart of FIG. 7.

As shown in FIG. 8, step 206 includes a plurality of steps 218-224. At step 218, the method includes performing a bitwise XOR operation on str1_sgmt and str2_sgmt. Step 206 includes checking the result of the XOR operation. If the result equals zero, a segment match is found and step 206 proceeds to step 208 of FIG. 7. If the result is not equal to zero, the method continues to step 222 to perform a bitwise OR operation on the result of the XOR operation and a predefined 4-byte flag. Typically the 4-byte flag is 0x20202020 (representing a 1 in the bit five position of each byte). Step 224 includes checking if the result of the OR operation is less than or equal to the 4-byte flag. If yes, step 206 finds a segment match and goes to step 208. If no, step 206 does not find a segment match and returns to step 216 with a negative string match. Step 212 includes steps similar to those described above for step 206. However, a segment match at 212 causes the method to continue to step 214 instead of continuing to step 208.

Figure 9:
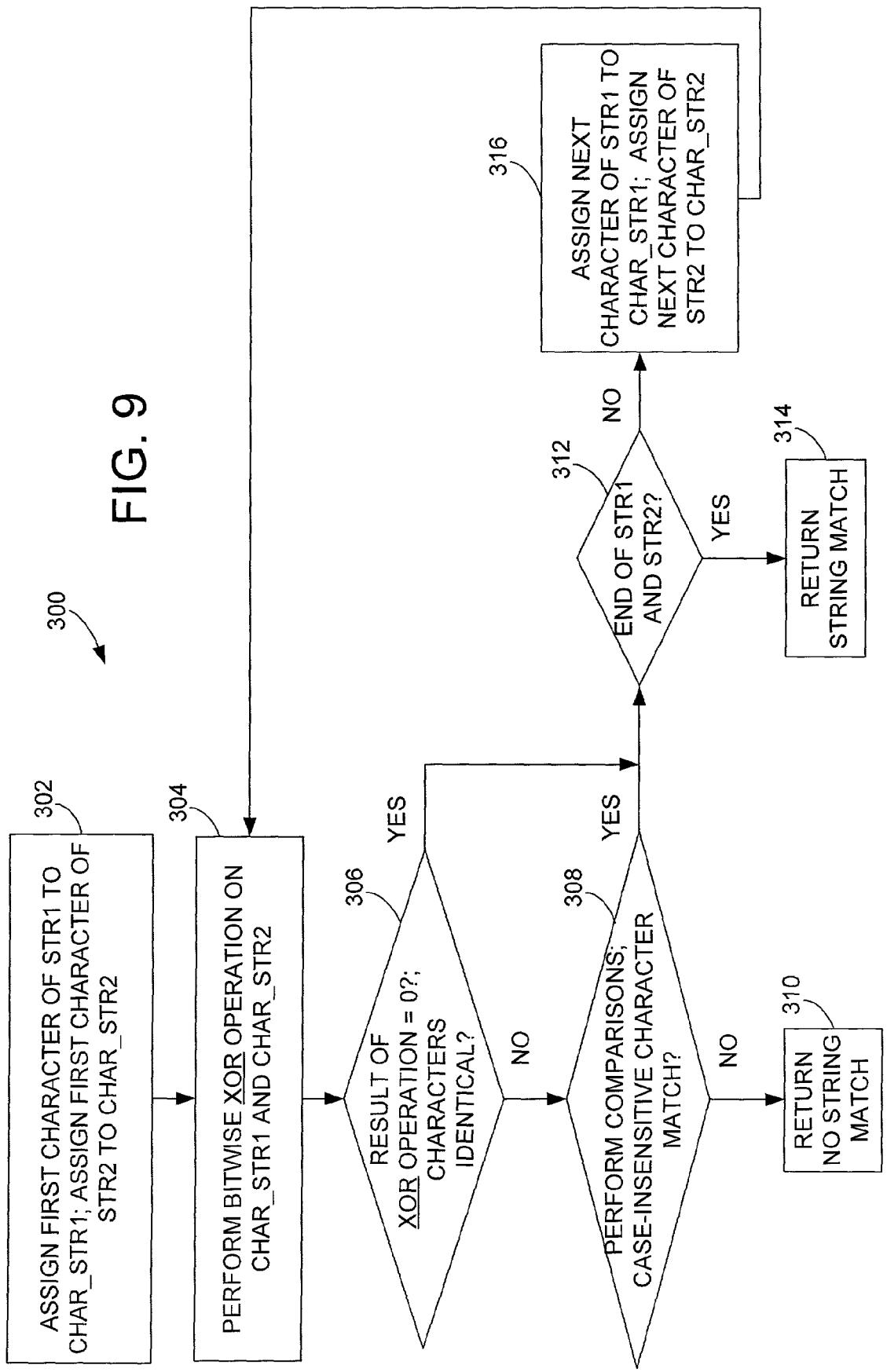
FIG. 9 is a flowchart of a string matching method according to yet another embodiment of the present invention.

Turning to FIG. 9, an alternative embodiment of string matching method is shown at 300. Method 300 includes identifying the segments of the strings by assigning the first character of str1 to a segment of str1 (char_str1) and assigning the first character of str2 to a segment of str2 (char_str2) at step 302. At step 304, the method further includes performing a bitwise XOR operation on char_str1 and char_str2. Method 300 further includes, at 306, checking if the result of the XOR operation equals 0, an indication that the characters are identical. If the result is not equal to 0, method 300 continues to step 308 to perform comparisons, further described in FIGS. 10 and 11. If the comparisons do not yield a case-insensitive character match, method 300 continues to 310 to return a negative string match.

If at step 306, the result of the XOR operation is equal to zero, method 300 proceeds to step 312 to check if the ends of str1 and str2 have been reached. If the ends of the strings have been reached, method 300 goes to step 314, to return an indication of a string match, meaning all of the characters of each string match. If the ends of str1 and str2 have not been reached, method 300 includes a step 316 of assigning the next character of str1 to char_str1 and assigning the next character of str2 to char_str2. Method 300 further includes returning to step 304. Method 300 cycles until the ends of the strings have been reached or until characters do not match. If at step 308, a case-insensitive character match is found, method 300 continues to step 312 to determine whether the ends of the strings have been reached.

Figure 10:
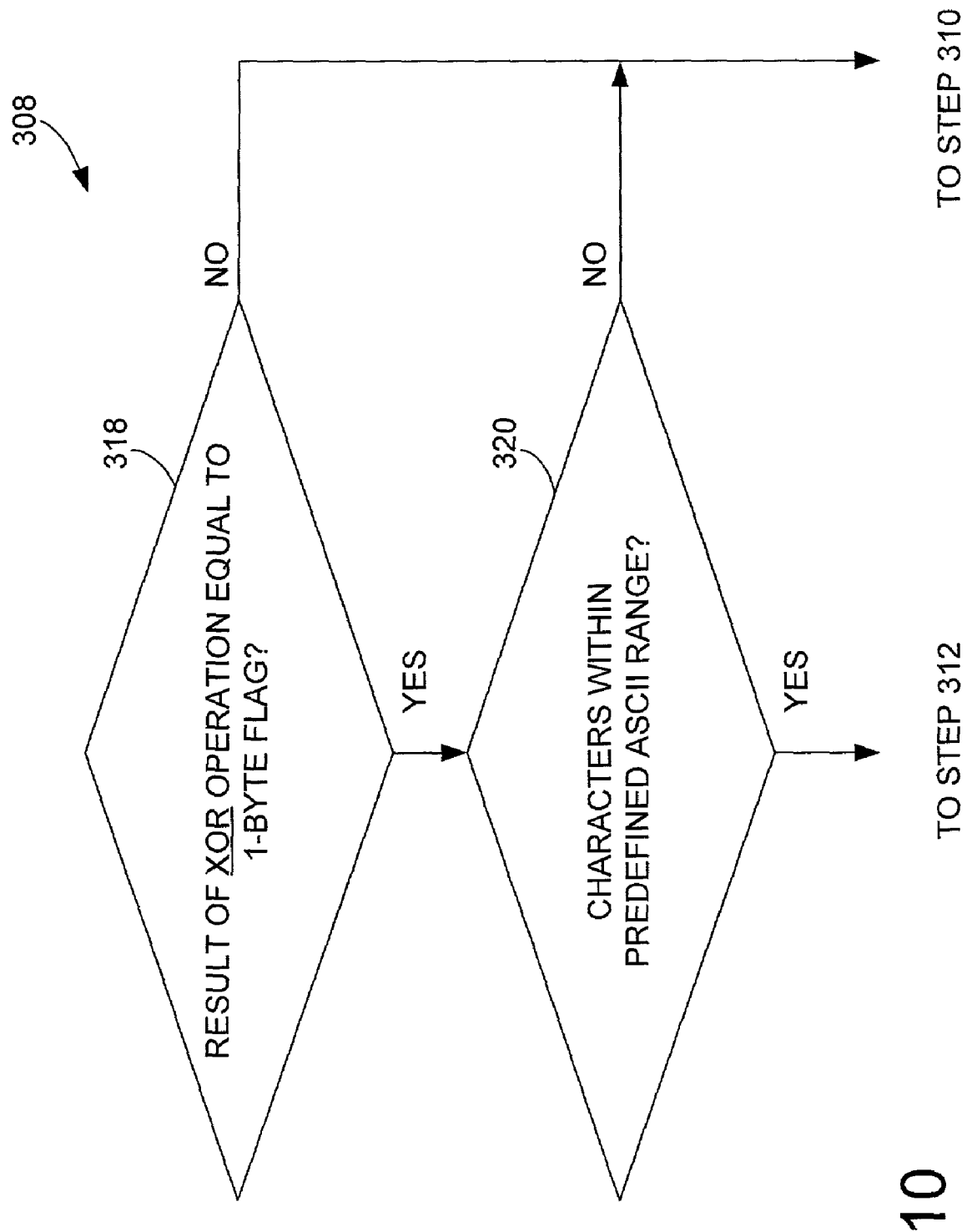
FIG. 10 is a continuation of the flowchart of FIG. 9.

Turning to FIG. 10, step 308 is shown to include steps 318 and 320. Step 318 checks if the result of the XOR operation is equal to a predefined 1-byte flag. The value of the 1-byte flag typically is 0x20 (representing a 1 in the bit five position). If the result is equal to the flag, step 308 proceeds to step 320, which checks the two characters that it is comparing to determine whether they are within a predefined ASCII range. The predefined ASCII range typically bounds the alphabetic portion of the standard 128 characters of the ASCII character set, described in more detail below and in FIGS. 11-12. The range is typically set to include only alphabetic ASCII characters. If the characters are within the predefined ASCII range, step 308 continues to step 312.

At step 318, if the result of the operation is not equal to the 1-byte flag, step 308 proceeds to step 310 and identifies a negative string match. At step 320, if the characters of str1 and str2 are not within the predefined ASCII range, step 308 goes to step 310.

Figure 11:
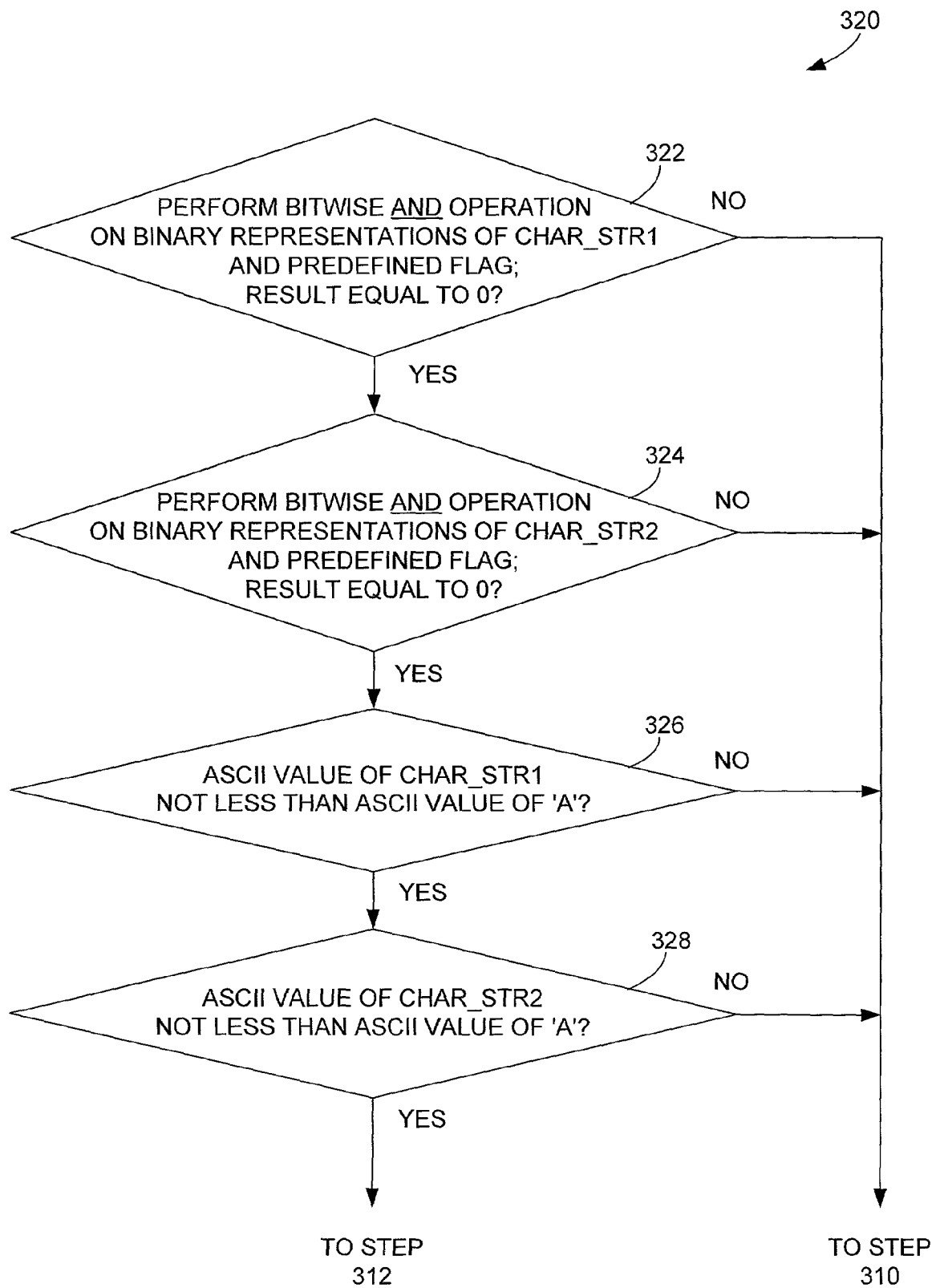
FIG. 11 is a continuation of the flowchart of FIG. 10.

FIG. 11 shows exemplary steps of step 320, which may be used to check if characters are within the predefined ASCII range. At step 322, step 320 includes performing a bitwise AND operation on char_str1 and a predefined flag. If the result is equal to 0, step 320 includes a step 324 that performs a bitwise AND operation on binary representations of character of str2 and the predefined flag. The value of the predefined flag typically is 0x80 (representing a 1 in bit seven). If the result is equal to 0, step 320 includes determining whether the ASCII value of char_str1 is not less than the ASCII value of the character 'A' at step 326. If the char_str1 is not less than 'A', step 320 further includes determining whether the ASCII value of char_str2 is not less than the ASCII value of the character 'A' at step 328. If the result for any of steps 322, 324, 326, and 328 is no, step 320 continues to step 310 to return a negative string match. Steps 322 and 324 determine the upper bounds and steps 326 and 328 determine the lower bounds of the alphabetic components of the ASCII table of characters, thus filtering out most, if not all, characters that do not have counterparts in either uppercase or lowercase characters. FIG. 12 shows the values of characters 33-128 (printing characters) of the standard ASCII character set in decimal and binary forms. The dashed line illustrates the predefined range of ASCII characters 330.

Figure 14:
FIG. 14 is exemplary computer code implementing the string matching method according to another embodiment of the present invention.

FIGS. 13 and 14 show computer code that implements embodiments of the invention corresponding to methods 200 and 300, respectively. In the code, LCASE_HIT is the 4-byte flag described herein, LCASE is the 1-byte flag, and EIGHT-BIT is the predefined flag. It should be understood that FIGS. 13 and 14 merely show two examples of computer code, and that many other computer implementations of the present invention are possible.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and nonobvious combinations of elements described herein, and claims may be presented in this or a later application to any novel and nonobvious combination of these elements. Where the claims recite "a" or "a first" element or the equivalent thereof, such claims should be understood to include incorporation of one or more such elements, neither requiring nor excluding two or more such elements.

I claim:

1. A computer-implemented method for comparing an unknown string to a predefined string, the method comprising:
    storing, on a network device, a database containing a plurality of predefined strings in ASCII binary representation, wherein the predefined strings stored within the database represent known headers for a network communication protocol;
    receiving, with the network device, a network message having characters in ASCII binary representation, wherein a case of the characters of the received network message is unknown by the network device;
    in response to receiving the network message, selecting one of the plurality of predefined strings stored within the database of the network device;
    identifying a portion of the network message as an unknown string for comparison with the selected predefined string, wherein the unknown string and the selected predefined string have an equal number of characters;
    dividing the unknown string and the selected predefined string into segments, wherein the segments of the unknown string and the segments of the selected predefined string have an equal number of the characters;
    performing a bitwise exclusive OR operation between the ASCII binary representation of each of the segments of the unknown string and the ASCII binary representation of each of the segments of the selected predefined string;
    performing a bitwise operation between a predefined flag and each result of the exclusive OR operations, wherein the predefined flag has an equal number of characters as the result of the exclusive OR operation;
    comparing the predefined flag and each result of the bitwise operations to produce an indication for a case-insensitive string match, wherein the indication for the case-insensitive string match indicates whether all the characters of the segments of the unknown string within the network message match all the corresponding characters of the segments of the selected predefined string so as to match one of the known headers of the network communication protocol;
    processing the network message based on the indication of the case-insensitive string match; and
    outputting a response from the network device based on the processed network message.

2. The method of claim 1, further comprising identifying a segment of the selected predefined string and identifying a segment of the unknown string for comparison with the identified segment of the selected predefined string.

3. The method of claim 2, wherein the segment of the selected predefined string and the segment of the unknown string contain a same number of characters.

4. The method of claim 2, further including left-shifting the binary representation of the segments if the segments contain less than four characters.

5. The method of claim 2, wherein identifying a case-insensitive string match includes identifying a case-insensitive segment match based on the exclusive OR operation.

6. The method of claim 1, wherein the predefined flag is 0x20202020.

7. The method of claim 2, further comprising identifying a subsequent segment of the selected predefined string and a subsequent segment of the unknown string for comparison.

8. The method of claim 1, wherein the predefined flag is zero.

9. The method of claim 1, wherein the predefined flag is 0x20.

10. The method of claim 1, wherein the predefined flag is 0x20202020.

11. The method of claim 1, wherein the segment of the unknown string and the segment of the selected predefined string each include one character.

12. The method of claim 1, wherein the segment of the unknown string and the segment of the selected predefined string each include four characters.

13. The method of claim 1, wherein the unknown string includes an HTTP header field.

14. The method of claim 1, wherein the selected predefined string is from a table of predetermined HTTP header fields.

15. The method of claim 1, wherein identifying a case-insensitive match further includes performing another bitwise operation.

16. The method of claim 1, further comprising identifying the length of the strings.

17. The method of claim 16, wherein the length of each of the strings are equal.

18. The method of claim 1, wherein the computer-implemented method is used over a WAN.

19. The method of claim 1, further comprising determining if characters of the strings are within a predefined ASCII range.

20. The method of claim 19, wherein characters not within the predefined ASCII range caused the method to yield a negative string match.

21. An article of manufacture comprising a non-transitory storage medium having a plurality of machine-readable instructions, wherein when the instructions are executed by a computing system, the instructions providing for:

storing, on a network device, a database containing a plurality of predefined strings in ASCII binary representation, wherein the predefined strings stored within the database represent known headers for a network communication protocol;

receiving, with the network device, a network message in ASCII binary representation;

in response to receiving the network message, selecting one of the plurality of predefined strings stored within the database of the network device;

identifying a portion of the network message as an unknown string for comparison with the selected predefined string;

dividing the unknown string and the selected predefined string into corresponding segments, wherein the segments of the unknown string and the segments of the selected predefined string have an equal number of the characters;

for each of the segments of the unknown string, performing a bitwise exclusive OR operation between the ASCII binary representation of the segment of the unknown string and the ASCII binary representation of a corresponding segment of the selected predefined string, wherein the segment of the unknown string and the segment of the selected predefined string have an equal number of characters;

for each of the exclusive OR operations, performing a bitwise operation between a predefined flag and a result of the exclusive OR operation;

for each of the bitwise operations, comparing the predefined flag and a result of the bitwise OR operation to produce an indication for a case-insensitive string match between the predefined string and the unknown string, wherein the indication for the case-insensitive match indicates whether all characters of the unknown string within the network message match all corresponding characters of the identified predefined string so as to match one of the known headers of the network communication protocol;

processing the network message based on the indication of the case-insensitive match; and outputting a response from the network device based on the processed network message.

\* \* \* \* \*